(12) United States Patent
Kamyshenko et al.

(10) Patent No.: US 12,393,719 B2
(45) Date of Patent: Aug. 19, 2025

(54) ARTIFICIALLY INTELLIGENT SYSTEMS AND METHODS FOR MANAGING DATA SECURITY

(71) Applicant: Dymium Inc., Los Gatos, CA (US)

(72) Inventors: Valentyn Kamyshenko, Los Gatos, CA (US); Igor Plotnikov, Sunnyvale, CA (US); Denzil Wessels, Los Gatos, CA (US)

(73) Assignee: Dymium Inc., Los Gatos, CA (US)

( * ) Notice: Subject to any disclaimer, the term of this patent is extended or adjusted under 35 U.S.C. 154(b) by 0 days.

(21) Appl. No.: 18/893,774

(22) Filed: Sep. 23, 2024

(65) Prior Publication Data

US 2025/0013773 A1 Jan. 9, 2025

Related U.S. Application Data

(63) Continuation-in-part of application No. 18/240,738, filed on Aug. 31, 2023.

(60) Provisional application No. 63/466,641, filed on May 15, 2023, provisional application No. 63/403,651, filed on Sep. 2, 2022.

(51) Int. Cl.
G06F 21/62 (2013.01)

(52) U.S. Cl.
CPC .............................. G06F 21/6218 (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 9,224,007 B2* | 12/2015 | Fox | ..................... | G06F 16/9535 |
| 9,641,544 B1* | 5/2017 | Treat | ..................... | H04L 43/04 |
| 9,912,695 B1* | 3/2018 | Chao | ..................... | H04L 63/1425 |
| 10,169,315 B1* | 1/2019 | Heckel | ..................... | G06F 21/60 |
| 10,222,417 B1* | 3/2019 | Garg | ..................... | G06F 11/25 |
| 11,250,876 B1* | 2/2022 | McCloskey | ..................... | G06N 20/10 |
| 11,275,850 B1* | 3/2022 | Brandwine | ..................... | G06F 16/24564 |
| 11,675,584 B1* | 6/2023 | Sengupta | ..................... | G06F 8/75 717/124 |
| 11,831,965 B1* | 11/2023 | Kamaraju | ..................... | H04N 21/266 |
| 11,863,589 B2* | 1/2024 | Koval | ..................... | H04L 63/102 |
| 12,095,796 B1* | 9/2024 | Godefroid | ..................... | G06F 9/542 |
| 12,099,468 B2* | 9/2024 | Kagan | ..................... | G01D 4/004 |
| 12,135,819 B2* | 11/2024 | Zarecki | ..................... | G06F 21/6254 |
| 2014/0298469 A1* | 10/2014 | Marion | ..................... | H04L 63/1416 726/23 |
| 2017/0244608 A1* | 8/2017 | Reaux-Savonte | ..................... | G06N 20/00 |
| 2017/0344887 A1* | 11/2017 | Ahmed | ..................... | G06N 20/00 |
| 2018/0011959 A1* | 1/2018 | Irissou | ..................... | G06F 30/39 |
| 2019/0273746 A1* | 9/2019 | Coffing | ..................... | G06Q 20/40 |
| 2020/0125746 A1* | 4/2020 | Joshi | ..................... | G06F 21/6245 |
| 2020/0125902 A1* | 4/2020 | Couse | ..................... | G06N 3/04 |

(Continued)

*Primary Examiner* — Jason Chiang
(74) *Attorney, Agent, or Firm* — Carr & Ferrell LLP

(57) ABSTRACT

Exemplary systems include an AI-powered assistant that automatically analyzes available data to create a contextual framework based on the nature of the query, the persona, and the permissions of the user, allowing it to provide relevant and personalized responses to user queries. The system can also generate contextual personas based on job descriptions within an organization, respond to specific tasks associated with roles, and integrate with network appliances and flow data to embed AI-generated insights into logging streams and ensure compliance with defined policies.

22 Claims, 11 Drawing Sheets

(56) References Cited

U.S. PATENT DOCUMENTS

| | | | | |
|---|---|---|---|---|
| 2020/0169543 A1* | 5/2020 | Vaughn | ............... | H04L 51/04 |
| 2021/0004432 A1* | 1/2021 | Li | ............... | G06F 40/295 |
| 2021/0064781 A1* | 3/2021 | Raphael | ............ | G06F 21/6254 |
| 2021/0124843 A1* | 4/2021 | Vass | ............... | G06Q 30/0255 |
| 2021/0216706 A1* | 7/2021 | Vaughn | ............ | G06F 40/30 |
| 2021/0256160 A1* | 8/2021 | Hachey | ............ | G06N 20/00 |
| 2021/0334116 A1* | 10/2021 | Kaplan | ............ | G06F 9/451 |
| 2023/0148158 A1* | 5/2023 | Bandarupalli | ...... | H04L 67/1008 |
| | | | | 709/224 |
| 2023/0208828 A1* | 6/2023 | Kolodziej | ........ | H04L 63/0823 |
| | | | | 726/6 |
| 2023/0245651 A1* | 8/2023 | Wang | ............... | G06N 5/022 |
| | | | | 704/275 |
| 2023/0336340 A1* | 10/2023 | Polleri | ............. | G06F 11/3003 |
| 2024/0078337 A1* | 3/2024 | Kamyshenko | ...... | G06F 21/6245 |
| 2024/0095385 A1* | 3/2024 | Dhouib | ............ | G06F 21/6254 |
| 2024/0256423 A1* | 8/2024 | Zhang | ............. | G06F 8/71 |
| 2024/0362008 A1* | 10/2024 | Schornack | ............. | G06F 8/65 |
| 2024/0372880 A1* | 11/2024 | Bansal | ............. | H04L 63/1416 |
| 2024/0403438 A1* | 12/2024 | Chan | ............... | G06F 11/0793 |

* cited by examiner

ARTIFICIALLY INTELLIGENT SYSTEMS AND METHODS FOR MANAGING DATA SECURITY

CROSS-REFERENCE TO RELATED APPLICATIONS

The present continuation-in-part application claims the priority benefit of U.S. Non-Provisional patent application Ser. No. 18/240,738 filed on Aug. 31, 2023, which in turn claims the priority benefit of U.S. Provisional Patent Application Ser. No. 63/403,651 filed on Sep. 2, 2022, and U.S. Provisional Patent Application 63/466,641 filed May 15, 2023, all of which are hereby incorporated by reference in their entireties.

FIELD OF INVENTION

The various exemplary embodiments herein generally relate to data security, ease of use, and integration. More particularly, the various exemplary embodiments herein relate to systems and methods of providing data security via a database proxy engine positioned within a network flow between a database source and a user or a computer system accessing the database source. Additionally, the various exemplary embodiments herein solve the challenges of cost and time associated with a data migration, the time and effort to utilize data from disparate sources, and balance data protection with data access.

BACKGROUND

Providing security to network devices or a data center is an important concern as data security attacks are becoming increasingly prevalent. Multiple security features may be implemented at different network layers to protect networks, data, and services from malicious attacks. The traditional approach to data protection is founded on the concept of perimeter protection with firewalls as controlled access points. One type of such firewall is a traditional Open Systems Interconnection (OSI) layer 3-4 solution that checks for Internet Protocol (IP) addresses and ports and blocks undesired traffic based on this information. Such a solution is strictly based on transport protocol, unaware of the payload. A more modern take on this approach is a protocol-aware OSI layer with multiple firewalls that adds the art of Intrusion Protection System (IPS). The system inspects the traffic, finds dangerous patterns, and provides or blocks access. However, this approach is becoming less and less productive due to protocols becoming end-to-end encrypted, such as from the clients to the applications.

Another common approach is another type of firewall, known as a Web Application Firewall, which inspects the HTTP requests and responses from and to a web application. The firewall looks for threats like SQL injection and data leakage. However, the traffic or requests that the firewall can inspect are very indirect and can be difficult to interpret and act upon. Therefore, threats of accessing data via malicious users are still present.

SUMMARY OF EXEMPLARY EMBODIMENTS

The present disclosure relates to providing data security systems and methods for protecting data within a database. The system further includes an AI-powered assistant that automatically analyzes available data to create contextual frameworks based on the nature of the query, the persona, and the permissions of the user. This contextual understanding enhances the AI assistant's ability to interpret user queries, provide personalized responses, and guide users through data access processes. Additionally, the system can generate contextual personas based on job descriptions within an organization, define and analyze tasks associated with roles, and integrate with network appliances and flow data to ensure compliance with defined policies.

An exemplary system and method of implementation and use may include at least one data access proxy communicatively coupled with at least one private database, the at least one data access proxy further communicatively coupled with at least one server, the at least one server configured to operate the at least one data access proxy to: identify a user and a request from the user to access at least one data item stored in the at least one private database; validate the user and the request, the validation including inspecting the user's identity, evaluating the user's activity history, and evaluating permissions and restrictions associated with the user and the at least one data item; access the private database to retrieve the at least one data item; inspect one or more security attributes related to the at least one data item; and transform the at least one data item based on one or more privacy rules, the transformation including one or more of the following: redacting the at least one data item, deleting information from the at least one data item, substituting information from the at least one private data item with other information, adding information to the at least one data item, providing synthetic data as a private data item, and providing proxy data for the at least one data item.

Exemplary systems and methods may further include providing a response to the user, the response comprising a transformed version of the requested data item, the transformed version being accessible to the user by way of the data access proxy; as well as operate the data access proxy to provide schemas of introducing misinformation as part of the response, the misinformation functioning as a tracker for tracing a flow of information and identifying a malicious user.

A further exemplary system and method of implementation and use includes at least one artificial intelligence resource comprising at least one named-entity recognition model, at least one large language model, and at least one artificial intelligence application supported by a neural network; and at least one server communicatively coupled to the at least one artificial intelligence resource and further communicatively coupled to at least one private database, the at least one server configured to operate the at least one artificial intelligence resource to identify a user and a request from the user to access at least one data item stored in the at least one private database; validate the user and the request, the validation including inspecting the user's identity, evaluating the user's activity history, and evaluating permissions and restrictions associated with the user and the at least one data item; analyze user activity associated with the user for suspicious activity; access the private database to retrieve the at least one data item; inspect one or more security attributes related to the at least one data item; transform the at least one data item based on one or more privacy rules, the transformation including: redacting information from the at least one data item, deleting information from the at least one data item, substituting information from the at least one private data item with other information, adding information to the at least one data item, providing synthetic data as a private data item, and providing proxy data for the at least one data item; reconstitute the at least one data item in a response to the request; and transmit the response with a transformed version of the at least one data item to the user or a designated recipient.

A further exemplary method may include providing a data access proxy, the data access proxy communicatively coupled to a private database shielding the private database, the data access proxy functioning as a Semantic Data Proxy (SDP), wherein a request from a user to access a data item such as personally identifiable information (PII) data item from within the private database is directed to the SDP, wherein the SDP mimics the private database; processing the request, wherein processing the request comprises identifying the request, inspecting the request, validating user's identity, accessing the private database to retrieve the requested data item, preparing the data item, transforming the data item according to the privacy rules associated with the private database, and providing a response to the user, the response comprising the requested data item, wherein the user access the private database via the data access proxy, such as SDP preventing user's direct access of the private database.

The systems and methods disclosed herein further provide for controlled access to the private database source (or file, stream and/or a data lake) via the data access proxy or SDP, wherein SDP functions as an intermediatory between the user and the private database and serves as a checkpoint, wherein the SDP (i) inspects the identity of the user requesting access, (ii) authenticate the request, (iii) validate user's identity, (iv) evaluate user's behavior, (v) evaluate user's history, (vi) evaluate permissions and restrictions associated with the data and with the user, or (vii) inspect attributes related to data such as confidentiality of the data or sensitivity of the data.

The user interacts with the data access proxy or SDP as if the user is interacting with a private database.

In various embodiments, the present disclosure further relates to preventing unauthorized access to a private database comprising providing a data access proxy, a private database accessible from the data access proxy via reverse tunneling infrastructure (meshserver/meshclient) wherein the data access proxy mirrors the private database, receiving a request to access a private data item from a user, wherein a user is sending a request to the data access proxy screen the request, wherein if the user has permission to access the private data item, the data access proxy access the private database, retrieve the data item, prepare the data item, transform the data item and provide a response to the user, wherein if the user has no permission to access to the private data item, the data access proxy either deny the request, block the access, provide synthetic information as a form of a data item, provide redacted information as part of a data item or provide misinformation as a data item. In various embodiments, identifying the request comprises comparing the user's identity with information from a user database. In various other embodiments, the user database is associated with the private database and stores a plurality of user information.

In various embodiments, transforming the private data item or data item comprises redacting the data item, deleting information from the private data item, substituting information from the private data item with other information, adding information to the private data item, providing synthetic data (that is consistent between tables, data sources, etc.) as a private data item, or providing proxy data as a data item. In various other embodiments, a response may be a redacted data item, a private data item, a PII data item, a synthetic data item, a proxy data item, or any other form of data, collection of information or any information presented to the user.

In various embodiments, validating a user's identity comprises validating the user's identity using an identification system such as an Object Identifier system (OID), including information such as user's name, user's role, user's private database permissions, user restrictions to access private database, user's past requests, user's frequency of requests and so forth to evaluate user's history and behavior. An object identifier (OID) is a string of decimal numbers that uniquely identifies an object. These objects are typically an object class or an attribute.

In various embodiments, preparing the data item may comprise extracting information from a single database and/or data source, extracting information from more than one database, extracting and combining information from more than one database, or extracting and transforming the information based on the user's identity and corresponding permissions.

Exemplary AI-Powered Contextual Analysis:

The system, according to various exemplary embodiments, includes an artificially intelligent ("AI") AI-powered assistant that automatically analyzes available data to create a contextual framework based on the nature of the query, the persona, and the permissions of the user. This context allows the AI assistant to provide relevant, accurate, and personalized responses to user queries, enhancing user interaction and overall system efficiency. Adding an AI-powered contextual analysis enhances the system's ability to understand and respond to user needs effectively, tailored to each user's specific context and permissions.

Contextual Personas and Job Descriptions:

In certain exemplary embodiments, the system can generate contextual personas based on job descriptions within an organization. By analyzing an employee's job description, the AI assistant builds a profile that includes permissions, responsibilities, and typical queries related to the role. This enables the AI assistant to provide more precise and relevant assistance based on the specific job function. Creating personas based on job descriptions allows the AI assistant to tailor its responses and functionalities to the specific needs of different roles within an organization, improving overall efficiency and user satisfaction.

Task-Based Contextual Analysis:

In addition to personas, the system, according to many exemplary embodiments, can analyze and respond to specific tasks associated with roles. By defining tasks within the system, the AI assistant can provide task-specific responses and actions. For example, a compliance specialist might define tasks to ensure no traffic from restricted countries is allowed on the WAN interface or to prevent downloads of schematic designs. Including task-based contextual analysis enhances the system's capability to manage and respond to specific operational requirements and security protocols, providing more granular and relevant assistance.

Integration with Network Appliances and Flow Data:

In various exemplary embodiments, the system integrates with network appliances and flow data, adding contextual personas and tasks to the inputs and outputs of these systems. This includes embedding AI-generated insights into logging streams and ensuring compliance with defined policies. Integrating with network appliances and flow data allows the system to actively manage and monitor network traffic and compliance, enhancing security and operational efficiency.

BRIEF DESCRIPTION OF THE DRAWINGS

The accompanying drawings, where like reference numerals refer to steps of the process and embodiments, together with the detailed description below, are incorporated in and form part of the specification and serve to illustrate further embodiments of concepts that include the claimed disclosure and explain various principles and advantages of those embodiments.

The process and composition disclosed herein have been represented where appropriate by conventional symbols in the flowcharts, photographs, or drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
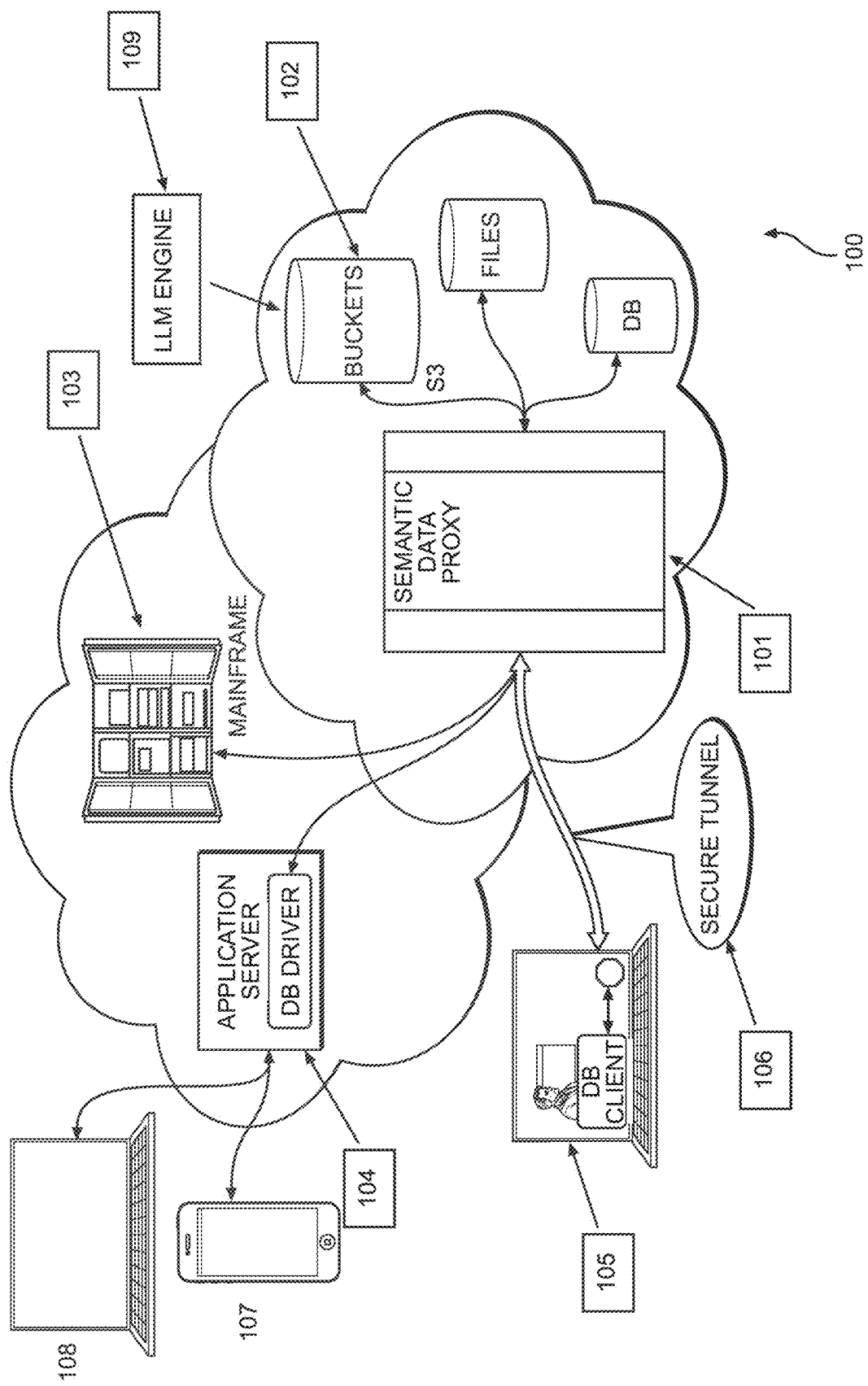
FIG. 1 illustrates an embodiment of the deployment of the disclosed technology.

While the presently disclosed systems and methods are susceptible to embodiment in many different forms, there are shown in the figures and will herein be described in detail several specific embodiments with the understanding that the present disclosure is to be considered as an exemplification of the principles of the present technology and is not intended to limit the technology to the embodiments illustrated.

In summary, provided herein are data security systems and methods for providing controlled and protected access to a private database via a data access proxy, the data access proxy being located within the network flow between a user and the private database, and wherein the data access proxy shields and mimics a private database. When a user accessing the private database interacts with the data access proxy, the data access proxy inspects the user to check the user's and the request's authenticity. The data access proxy interacts with the private database to retrieve the requested data, transform the data, and provide a response, thereby providing controlled access to and protection for the private database engine, wherein the user has no direct access to the private database.

Related applications may use alternative terms for a data access proxy, including proxy database, ghost database, or Semantic Data Proxy (SDP). In general, these terms are interchangeable and refer to the use of a proxy terminal by which to access data stored in one or more private databases. Context, however, may indicate a specific or alternative functionality or purpose as described herein.

The data access proxy, also referred to as Semantic Data Proxy or SDP, inspects every data request received from any user, inspects responses before releasing the data item, modifies the request based on privacy policies or protocols associated with the request or with the user requesting a data item, or modifies responses before releasing the data item.

A private database may be any database or data source, such as but not limited to files, S3 buckets, data warehouses, or data lakes. A user may be accessing or requesting access to a database through an external source such as a local analytics program, Software as a Service (SaaS), or a Jupyter interactive environment to a local address. The database may be a private database, a public database, a private cloud, a cloud storage, a data storage engine, a server with a plurality of databases, a network of databases, any destination database, or any source of collective information to which a user may request access.

The disclosed methods and systems prohibit users' direct access to the private database, routing any such access through the SDP.

In many embodiments, a user may connect to the SDP using a native database protocol, for example, PostgreSQL. SDP may present multiple network interfaces that implement various data access protocols, such as SQL, NoSQL, flavors, REST, GraphQL, etc.

In these and further embodiments, if the data sought is not sensitive, the data item may be prepared and presented to the user in plain text, or in the same format in which it is stored in the private database, without modification or redaction.

If, in the alternative, the information sought is sensitive in nature, the SDP may modify the data in accordance with the owner's data access policy rules. For instance, the data may be partially redacted, or the data access policy rules may define parameters regarding which users have access, what types of data are accessible to a type of user, and how much data is available to a type of user. The user may then receive a redacted or substitute data item with alternative information, or proxy information. The user would have no direct access to the private database, but would be directed to the SDP, thereby protecting data from unauthorized access and threats. The proxy information may function as a tracker to trace the user's activities.

For example, a user may be a customer being assisted by technical support staff. The technical support person may or may not know the real name of this customer, and the information provided to the technical support person may be a proxy name for privacy reasons. The system will then address the customer with a proxy name, effectively shielding the customer's identity. As a further example, a user may request a list of customers for monthly sales analysis. The request may be routed via the SDP, which redacts personally identifiable information (PII) from the list and provides only the monthly sales numbers for analysis.

As a further example, a user such as a bank employee helping clients open a new bank account may access a defined data item from the database and may subsequently attempt to access credit card information for multiple accounts. The request will be routed to the SDP, which will inspect the request. Based on the user's role and past behavior, the SDP would raise concerns regarding the request. The SDP may, for example, alert higher authorities in the organization of a security breach, block the access, deny the information, provide proxy information, or provide synthetic information to track the user's activities.

In various embodiments, the systems and methods described herein protect against unauthorized access wherein a request to access the database is directed to the SDP. The SDP inspects the request by scanning the user making the request, nature of the request, type of information requested, and amount of information requested. If, for example, the request includes access to an extensive database or a download of a large number of files, the request can be inspected before processing. The presence of the SDP serves as a protective wall or a firewall between the user and the private database, providing controlled access to the database.

The technology disclosed herein further provides methods for developing database access schemas for preventing unauthorized access or maintaining controlled access to data within a database.

In various embodiments, the methods and systems provided herein provide schemas of introducing misinformation or synthetic information as part of the requested data provided to the user. The synthetic information may function as a tracker for tracing the flow of information and identifying the user's identity, such as a data breacher or a hacker. The synthetic information or the misinformation would mirror the actual information, thereby avoiding alerts that a tracker is installed in the requested data.

In various embodiments, the systems and methods provided herein include organizing the data within the database. For example, methods may be performed such as identifying the data and organizing the data based on attributes defining the data, such as confidentiality associated with the data, the sensitivity of the data, type of data, nature of the data, field of data, a quantity of data, and so forth.

In various embodiments, the disclosed technology provides for an automatic pre-detection of sensitive information and PII wherein the system searches and extracts patterns within columns or databases and associates the pattern with the known class of PII. The technology helps identify the type of data and amount of data, segregate the sensitive information from non-sensitive information, identify classified information, identify rules for different sets of data, and develop policing for accessing the data, such as HIPAA or Zero Trust policies.

As used herein, Zero Trust security generally means that no one is trusted by default from inside or outside the network, and verification is required from everyone trying to gain access to resources on the network. This added layer of security has been shown to prevent data breaches.

In various other embodiments, the systems and methods provided herein provide for an automatic pre-detection of sensitive information and PII, wherein the system searches to extract a subset of the data from the database and searches for the PII in the data itself. This can be achieved with pattern searching or with a neural network providing faster access and response to data requests wherein some of the responses are added as default responses, reducing the time of responses to a data request and reducing the time to configure the policy for a database search.

An exemplary system and method may include performing authentication by way of the SDP. Existing authentication mechanisms may be used. Integration and use are streamlined from the start. Multiple logins are not required. A connector may be employed that may communicate with an organization's database. In this way, an organization's database does not need to be communicatively coupled with outbound systems and may not even need Internet access. As a result, security is enhanced. Additionally, the exemplary systems and methods described herein may automatically set up the data so that it may be presented to the user on a need-to-know basis consistent with any applicable data regulations, such as those given for a particular geographic region.

In some exemplary systems and methods, within databases one may go from unstructured to structured, or from structured to unstructured. Conversions may be performed, such as from a Mongo DB to an SQL database. One may create a virtual database by supplying it with a plurality of Application Programming Interfaces (APIs). Additionally, data may be obfuscated, redacted and or blocked.

As another example, a use case is provided for a merger between organizations with common customers. A single query may query the loyalty programs of all organizations to determine the total number of points and point distribution for any particular customer. The time savings of this methodology versus going from database to database is tremendous. Additionally, different programming languages may be involved. Programing languages, protocols, application programming interfaces ("API's) in addition to Structured Query Language ("SQL") may be used on both sides (i.e., customer side and/or data silo side).

Further systems and methods may implement machine learning and artificial intelligence for performing the functions of the SDP. Such sources may be implemented using an artificial intelligence resource comprising, for example, at least one named-entity recognition model, at least one large language model, and at least one artificial intelligence application supported by a neural network. The artificial intelligence resource may be coupled to one or more servers and further coupled to at least one private database. The servers may be configured to operate the at least one artificial intelligence resource to identify a user and a request from the user to access at least one data item stored in the at least one private database; validate the user and the request, the validation including inspecting the user's identity, evaluating the user's activity history, and evaluating permissions and restrictions associated with the user and the at least one data item; analyze user activity associated with the user for suspicious activity; access the private database to retrieve the at least one data item; inspect one or more security attributes related to the at least one data item; transform the at least one data item based on one or more privacy rules, the transformation including: redacting information from the at least one data item, deleting information from the at least one data item, substituting information from the at least one private data item with other information, adding information to the at least one data item, providing synthetic data as a private data item, and providing proxy data for the at least one data item; reconstitute the at least one data item in a response to the request; and transmit the response with a transformed version of the at least one data item to the user or a designated recipient.

As used herein, the term language model generally refers to a probability distribution over sequences of words. Language models generate probabilities by training on large and structured sets of text, or text corpora. A single text corpus may include a single language or many languages, and may have various levels of structure based on, for example, grammar, syntax, morphology, semantics, and pragmatics.

A large language model, or LLM, refers to a language model consisting of a deep learning architecture that is trained on large quantities, often tens of gigabytes, of unlabeled text using self-supervised learning or semi-supervised learning to produce generalizable and adaptable output. The deep learning architecture may be comprised of a neural network with billions of weights or parameters. In some embodiments, the neural network may be a transformer, which uses parallel multi-head attention mechanism, or alternatively the neural network may be recursive, operating in sequence.

As used herein, Artificial Intelligence Resource refers to a collection of AI programs and AI engine for determining an optimal program for a particular task. The Artificial Intelligence Resource may, for example, receive a query from a user in plain text and use machine learning techniques to determine the content of the request, such as by Named-Entity Recognition (NER) to recognize names, titles, and other specific information within a data item. The NER may be trained on data pertaining to names, titles, organizations, locations, codes, quantities, and other predefined categories.

The user query may contain, for example, a personnel file or patient record. The AI resource may pass the request to a Named-Entity Recognition model, which may detect that sensitive information such as personally identifiable information (PII) is included in the data item and may alert the AI resource. The AI resource may then process the response with a large language model, whereby the large language model may, for example, use predictive text to prepare a redacted or altered version of a response, or to generate synthetic data to mask the personally identifiable information. The large language model may also be used to generate and validate code for a security measure, including comments within code that can be used to track a user's subsequent activity.

Machine learning techniques such as neural network applications may be used to recognize suspicious activity. For example, the AI resource may direct information associated with a user, including user history and behavior, to a neural network application for detecting anomalous or outlier activity for the user. The neural network application may be trained on query history data to recognize routine, conventional activity and anomalous activity associated with a category of user, such as common and anomalous query types and sudden changes in user activity.

In these and further embodiments, a company may use a chatbot supported by a large language model. The large language model may be trained on a corpus of company files, emails, chats, images, documents, and other organizational legacy resources.

In general, a company's legacy resources will have access controls attached, such as access-control lists (ACLs). As used herein, an access control list generally refers to a list of permissions associated with a system resource (object or facility) that may specify, for example, which users or system processes are granted access to which resources, as well as what operations are allowed on given resources.

When a large language model is trained on an organization's legacy resources and used to support a chatbot, access controls must be accounted for.

Exemplary embodiments include a data security system that accounts for access controls using artificial intelligence resources to detect suspicious, malicious, or unauthorized behavior. As noted previously, the artificial intelligence resource may include a named-entity recognition model that detects words of concern in a received query. However, it is possible to have a question posed to the artificial intelligence resource that is sensitive in nature, even without specific words of concern. The artificial intelligence resource may thus include additional machine learning functions, such as object or optical character recognition (OCR), text or image classification, and probabilistic reasoning.

For instance, when a query from a particular user or particular type of user changes in scope or frequency, the artificial intelligence resource may use probabilistic reasoning to classify the behavior as suspicious. A sudden increase in queries for sensitive matter such as personally identifiable information, especially when such queries are concentrated in a recognizable geographic area or category of user, may warrant a determination of suspicious activity. Suspicious queries may include recognizable characters, text, source code, or images.

The artificial intelligence resource may then communicate its determination to a server supporting the organization's access controls. The server and artificial intelligence resource may thus function as an access proxy ensuring data security for the organization.

An exemplary method may include:

1. Receiving a request to access an AI resource. In various exemplary embodiments, an AI resource may function as the AI resource of a plurality of AI programs, knowing the optimal AI program to which to direct a query. Criteria such as data quality, performance, or security may be used to make such decisions.

In various exemplary embodiments, a browser widget may be employed that would resemble a large language model application like ChatGPT for entering a query. The widget may also include an enterprise policy control interface.

2. Sanitizing the request of personally identifiable information, trade secret information, HIPAA information, GDPR information, and other sensitive information. Additionally, transformation of requests may also be automatically performed, such as the elimination of hyphens from social security numbers. The possibilities are limitless and may be defined by the users or customers.

3. Transmit the request to the AI resource. In some situations, the request may be in the form of an automated request for a dataset. In other embodiments, the request may be defined by a customer.

Additionally, a set of criteria may be defined to direct the transmittal of the request. For example, a financial budget or an estimated threshold by a user, department, or group may be established for the transmission of requests.

4. Receive a response to the request from the AI resource.

5. Analyze the response for anything suspicious, such as malware. Through generative AI, attackers may generate new and complex types of malware, phishing schemes, and other cyber dangers that can evade conventional protection measures. The exemplary systems and methods described herein may spot and neutralize such threats or vulnerabilities. Additionally, source code generated may be validated, including any associated licensing in an effort to prevent or eliminate the chances of intellectual property infringement or infringement of international law or policy. For example, when a request is for source code to perform a particular function, the system may perform quality control. Additionally, as described herein, a risk score may be generated. Comments may be included with source code. The comments may also include a tracking token. Multiple programming languages may be generated or supported.

Additionally, responses may be received from a plurality of AI resources and compared and/or analyzed. Potential errors may be identified and/or remediated. It can also be an AI resource that can interpret other AI responses. In various exemplary embodiments, a preferred list of AI resources may be generated and/or automatically updated. Various scores for items such as response security may be generated and utilized. Iterative methodology (including algorithms) may be generated for the direction of entered requests. Criteria such as latency may also be used for the direction of entered requests. A plurality of responses from different AI resources may be compared, combined, and/or edited to create a single response. Voting logic may be utilized to remove outlying responses. Furthermore, load balancing techniques may be used for directing a plurality of requests.

6. Reconstitute the response with the sanitized information (e.g., Personally Identifiable Information ("PII") and/or secrets). Synthetic data may also be inputted, in some cases resembling the PII and/or secrets. In various exemplary embodiments, received code may be compiled and/or signed and sent to a cloud resource A dashboard including metrics with respect to the potential leakage of PII and/or secrets may be generated in an effort to quantify the quality of various AI resources and/or the quality of requests being submitted by particular individuals, organizations, etc. where the quality may be created by a human, machine and/or combination thereof. Furthermore, a normalized score may be generated to reflect the riskiness of the original requester. Risk may be defined in terms of the entry of PII and/or secrets.

7. Transmit the reconstituted response to the original submitter and/or to a designated recipient.

8. In the event an AI resource is compromised (e.g., breached or acquired by another vendor with conflicting interests or the like), a kill switch mechanism may be implemented to minimize or eliminate any damage to requesting parties operating on the system described herein. For example, an AI resource may be partially or completely disabled while allowing an authorized administrator to override and/or remediate the disabled AI resource.

Although references may be made to ChatGPT, it should be understood that this is by example and by no means limited to ChatGPT. Other similar applications and/or AI engines may be employed.

FIG. 1 illustrates an embodiment of the deployment of the disclosed technology with multiple data consumers (100) wherein Semantic Data Proxy ("SDP") (101) is positioned within the network flow between the database (104, also referred to as an application server) and a user (105). The SDP is provided access to unencrypted data present within various data sources, such as an application server (104), a device (107), a computer device (108), or the mainframe (103). The SDP (101) functions as a data access proxy comprising files, at least one database, a large language model ("LLM") engine (109), S3 buckets (102) or other collections of information wherein a user accessing the database is directed to the SDP. The SDP may mimic a database (104) comprising components of a real database, such as private data wherein the user accesses the SDP as if accessing the private database. The user may be a client, a customer, an employee of an organization, a data scientist, a web server, a data consumer or any user who needs to or is accessing the database. FIG. 1 shows a user (105) accessing the database from a computer connected to an internet service. The user (105) is directed to the SDP, wherein the SDP provides a secure tunnel (106) over an encrypted authenticated connection to connect the local application to a local host socket.

Figure 2:
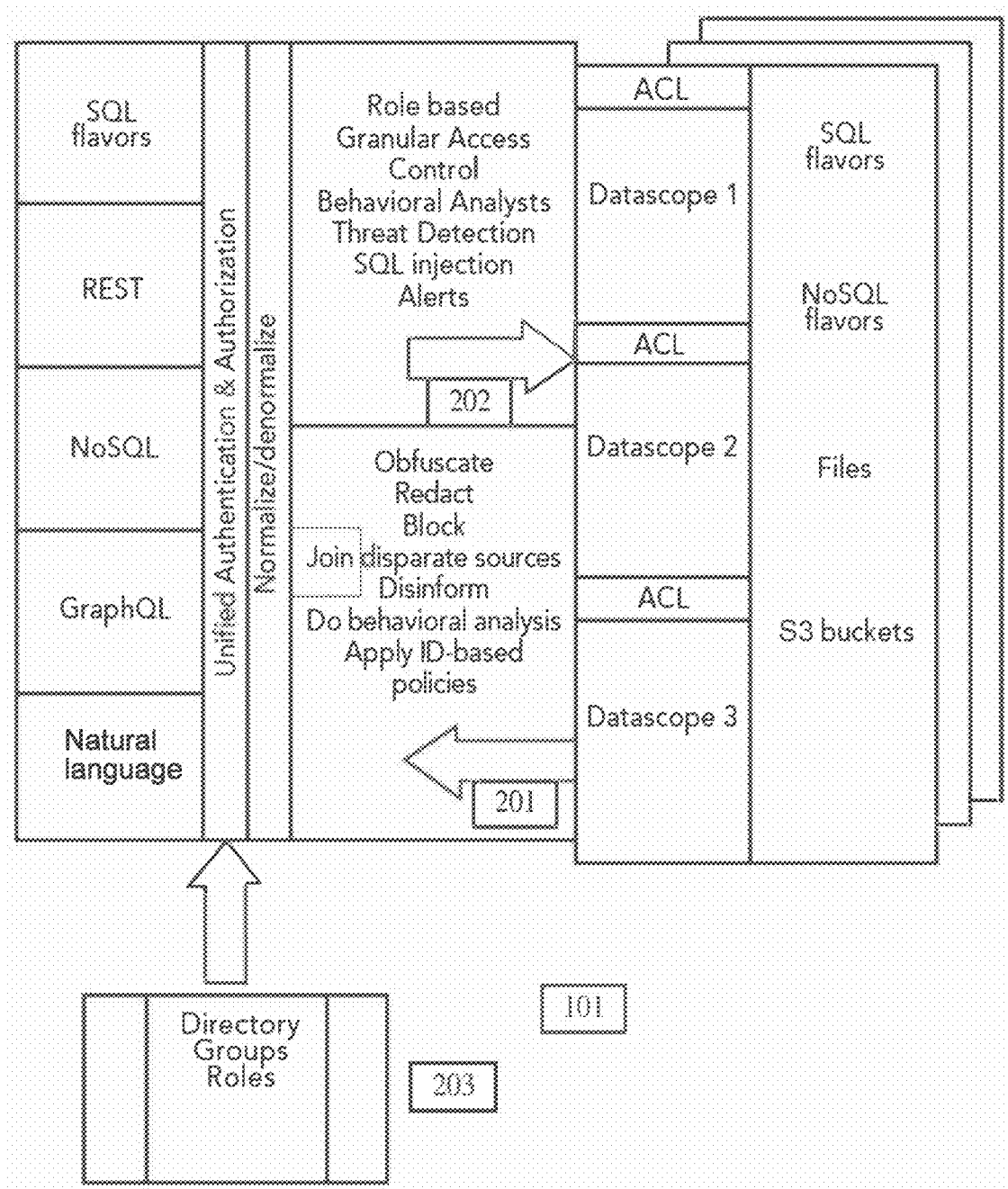
FIG. 2 illustrates a functional diagram of an embodiment of the disclosed technology.

FIG. 2 is a functional diagram of an embodiment of the present technology. As shown in FIG. 2, the data request flow is from left to right (202), and the response flow is opposite (201). The figures provide that the SDP (101) provides a protocol layer facilitating client connections wherein SDP authenticates the user requesting data or information. The authentication process may comprise identifying information such as the role of the user, identity of the user or so forth from a user directory (203). The directory may also define a data access policy, a user database and other related information necessary to inspect the user's identity and data. The SDP may then normalize the request, such as by converting the request into a standard dialect of SQL language. As provided, the data access policy within the SDP may provide for role-based granular access control, wherein the ghost database has access to the control list and inspects the user's request based on the information from the directory. The SDP may perform behavioral analysis based on the history of the user and user's associated benign or malicious behavior. For example, if the user's behavior is suspicious, the user will be flagged and the activities will be monitored further, or the user may not be allowed to access the database or retrieve any information from the database. Suspicious behavior may be determined from outliers in user activity, such as sudden changes in the amount or type of data sought by the user. If the user is requesting access that is beyond the scope of permissions for the particular user, the user will not be provided with any access to any information identifying threats to the data.

In various embodiments, the ghost database implements a virtual database or a virtual warehouse combining multiple connections to data sources and presenting a unified view of the data. In various embodiments, this unified view of the data may be an SQL database comprising a tightly defined subset of multiple data sources. For example, two different tables with a column containing social security numbers (SSN) can be configured and a "join" function can be performed between the tables on the SSN values with the obfuscated result. In this way, the data consumer obtains a synthetic SSN. The data sources requests may be denormalized to the data sources' protocols for those data sources. These protocols may have variations in format, such as different SQL implementations, including PostgreSQL, Oracle DB, MySQL, and others.

Figure 3:
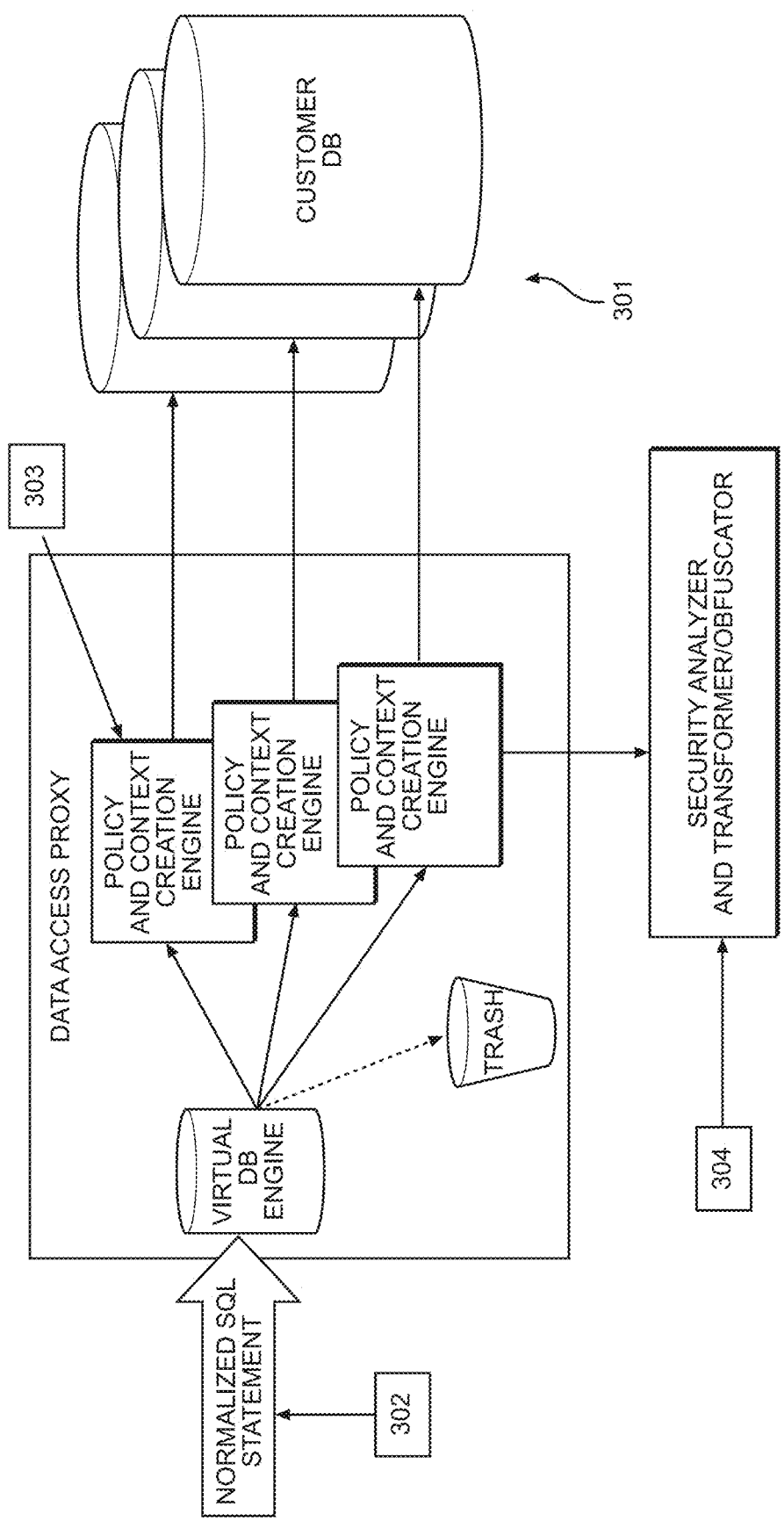
FIG. 3 illustrates an operational embodiment of the disclosed technology.

FIG. 3 illustrates a ghost database operation (301) as per the methods and systems described herein, wherein a ghost database receives a request for data as a normalized input (302). The ghost database of SDP splits the request into subsets of requests based on the initial request's attributes, then directs those subsets to corresponding databases (104). Each subset of requests is evaluated as per the access policy by the policy and context creation engine (303) associated with the corresponding subset such that the database provides the limited data as in the requested subset as schemas and tables. The data is routed back to the SDP wherein the SDP combines the data, transforms the data, and sends a response. The process ensures that every request is routed to its corresponding database per the access policy associated with such a request. Additionally, in some exemplary embodiments, graphically, requests flow from the policy and context creation engine (303) to the configuration engine and various data sources (e.g., vector databases, text documents, datasheets). The responses from these data sources are passed through the security analyzer and transformer/ obfuscator (304) to ensure that sensitive data is adequately transformed before further processing.

Figure 4:
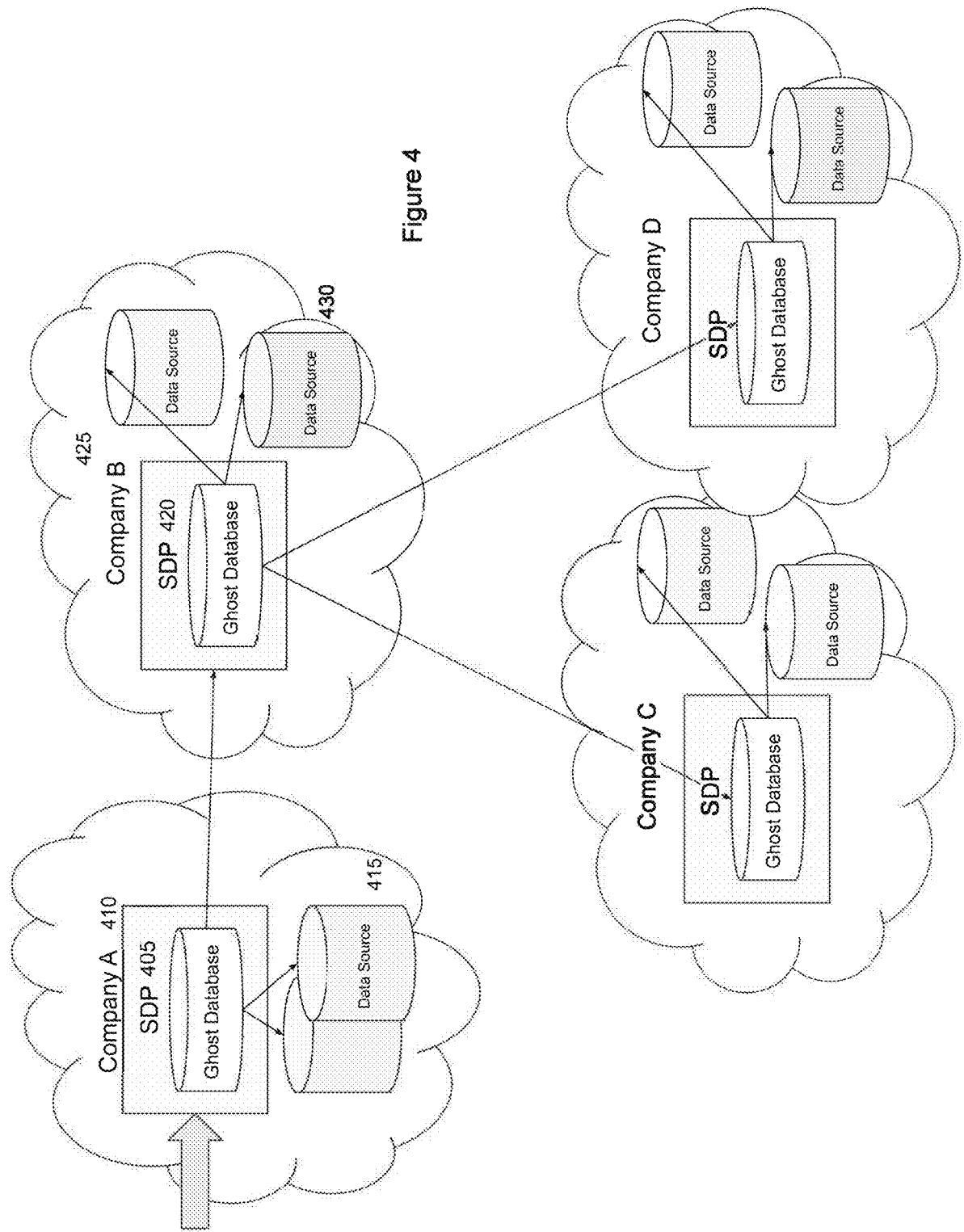
FIG. 4 illustrates an example embodiment of the disclosed technology.

FIG. 4 illustrates an example embodiment of the present technology wherein the system can be used to access a plurality of databases at the same time, retrieve the information from multiple databases, combine the data, process the data, and prepare a response. The plurality of databases may be related or may not be related. Further, they may be a part of a single organization or may be a part of a plurality of organizations, such as a group of subsidiaries or a federation of organizations. The data access proxy combines information from a plurality of databases to prepare a response. For example, a user is performing a combined study and needs information related to selling shoes within a particular region. For the study, the user would need information from a plurality of shoe-selling companies. The user would request such an information; the request would be routed to a first SDP (405) of a first organization (410) from the plurality of organizations, wherein the plurality of organizations is participating in the study and have granted limited permission to access the limited data from one or more first company data sources (415) as necessary to conduct the study. The first SDP (405), after inspecting the request, access policy, and request attributes, may contact a second SDP (420) of a second organization (425) from a plurality of organizations. The second SDP (420) may perform inspection and retrieve the data from one or more second company data sources (430). Following retrieval of a complete set of data in the form of tables or schemas from the plurality of SDP, the first SDP (405) combines the plurality of data, prepares the data, and presents the results showing combined sales data of shoes sold in a particular region.

The technology further provides methods and systems for preparing a new database in real-time from a plurality of databases without directly accessing the private database. Thus, the technology helps create a new data source from all different data types within a cloud or data server in a short time and without compromising security.

Figure 5:
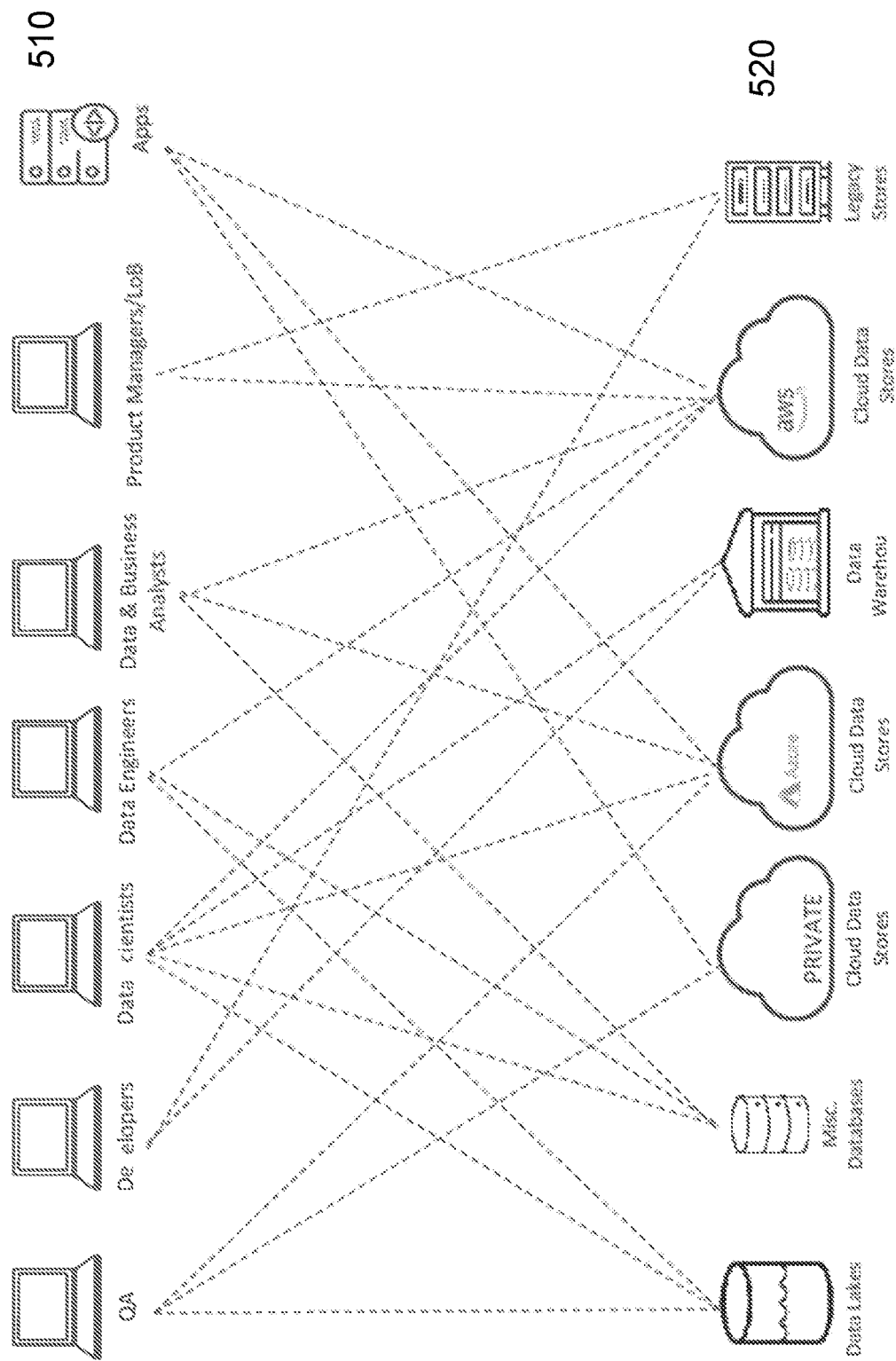
FIG. 5 illustrates the establishment of a direct connection for legacy data access.

FIG. 5 illustrates the establishment of a direct connection for legacy data access. This approach requires extensive resources in terms of time and money for data migration, as well as effort to utilize data from many different source types, and directly puts data access at risk in order to maintain data protection.

For example, it is very costly to migrate data to a unified platform. Much effort can be spent on the unneeded duplication of data. Weeks may be spent manually pulling data to build new datasets. Access to critical resources may be unjustly denied. Additionally, antiquated techniques like printing and redacting may be used at great expense.

As illustrated in FIG. 5, the way data access works today is with many consumers (510) connecting to data silos (520). Direct network connectivity is required to connect applications. As a result, breaches can happen. Direct access to databases where access is not needed can occur. Thus, database dumps of data being stolen from different companies take place daily. Another challenge as illustrated in FIG. 5 is in the situation where one may wish to build a new set of applications and would be required to go into each one of these data silos (520), export data, normalize the data, and then set up a new database to support new applications. From a business operations standpoint, one must deal with mega volumes of data, different versions of the data and different silos in different data centers spread all over the world. One is challenged to pull together analytics and tools to be able to understand all of this. It is thus a challenge for an organization to make sure that only the right people get the right information and that personally identifiable information is not given away.

One of the major challenges becomes how to secure the data that is in these data silos (520) and decide who has access. One can try to deal with this problem by copying voluminous amounts of data and using it in a new place. The downside of this is that one is paying double for storage. Additionally, a copy of the data is put at risk. Generally, it may take about 48 weeks to build a new data set. One alternative approach is to deny access to data altogether. The problem with this approach is that one will stall the operation of their organization.

Figure 6:
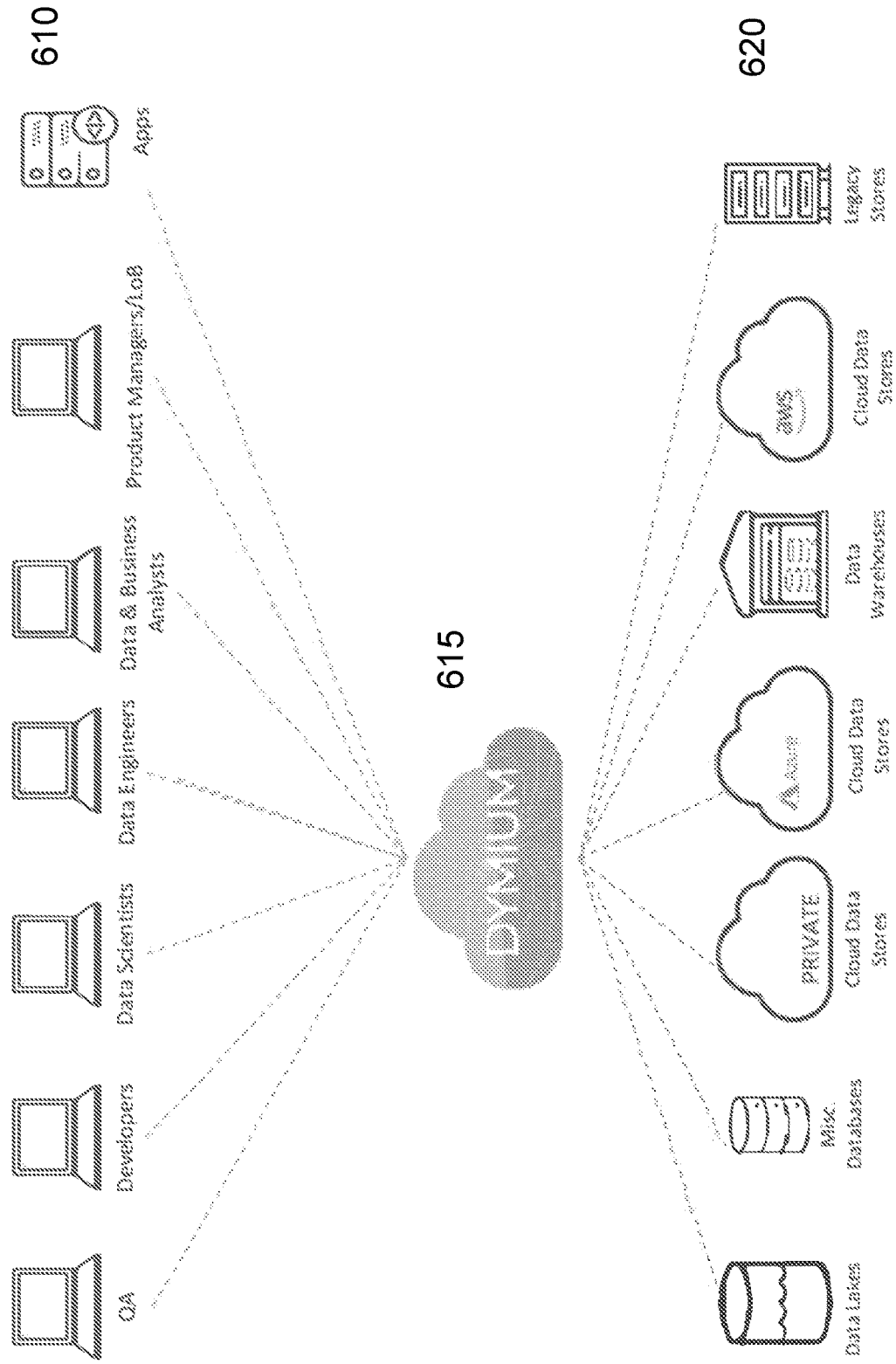
FIG. 6 illustrates an exemplary embodiment that solves the challenges of cost and time associated with a data migration, the time and effort to utilize data from disparate sources, and balances data protection with data access.

FIG. 6 illustrates an exemplary embodiment that solves the challenges of cost and time associated with a data migration, as well as the time and effort to utilize data from disparate sources. This approach balances data protection with data access.

As shown in FIG. 6, no changes are required to infrastructure. One may use an existing Identity and Access Management (IAM) system. There is no need to change data location or format. The exemplary systems and methods shown herein enable zero trust for data use. Personally identifiable information (PII) may be protected, and a complete audit trail may be created. In contrast to FIG. 5, there is not a myriad of direct data connections.

The exemplary systems and methods illustrated herein can enable, within the context of a mega merger of various organizations with different systems, the use of data in a new way across the entire megastructure.

As illustrated in FIG. 6, a service has been built that sits between the data consumers (610) and the data silos (620) in the organization. The virtual databases, otherwise known as ghost databases, pretend to be data silos in the organization so that all data consumers (610) end up talking to a single security front end (615). This single security front end (615) can determine who is querying what and behavior may be collected. Security policies may be developed. Data silos (620) may be in the form of Microsoft, SQL, Oracle, and other forms and can be normalized. Existing data stores do not require migration or other changes. All of these operations may take place very quickly.

As an example, consider a situation where one hotel chain buys another hotel chain. Each chain has different database forms, different cloud storage vendors, and different ways of performing queries. A major challenge for such a company is how to consolidate the set of information to make all data that they have valuable. The exemplary systems and methods herein become one central place that all data resides within. No copies of data need to be made.

It is noted that a network may include one or more networks of the same or different types. The network can be any type of wired and/or wireless public or private network, including a cellular network, a local area network, a wide area network such as the Internet or the World Wide Web (WWW), a personal area network, etc. The network further may comprise sub-networks and consist of any number and types of communication networking devices. Processors may be implemented in hardware and/or firmware.

One or more processors may execute the methods as described herein as understood by those skilled in the art. The instructions to execute the methods as described herein may be carried out by a special purpose computer, logic circuits, or hardware circuits.

The term 'data' may further include any form of data in any suitable format that may be communicated to a computing device (e.g., client device, server, proxy) and/Binary, numeric, voice, video, text, photograph or script data, or any form of source or object code, or the other relevant information.

SDP includes one or more modules configured to protect data designated as private.

Figure 7:
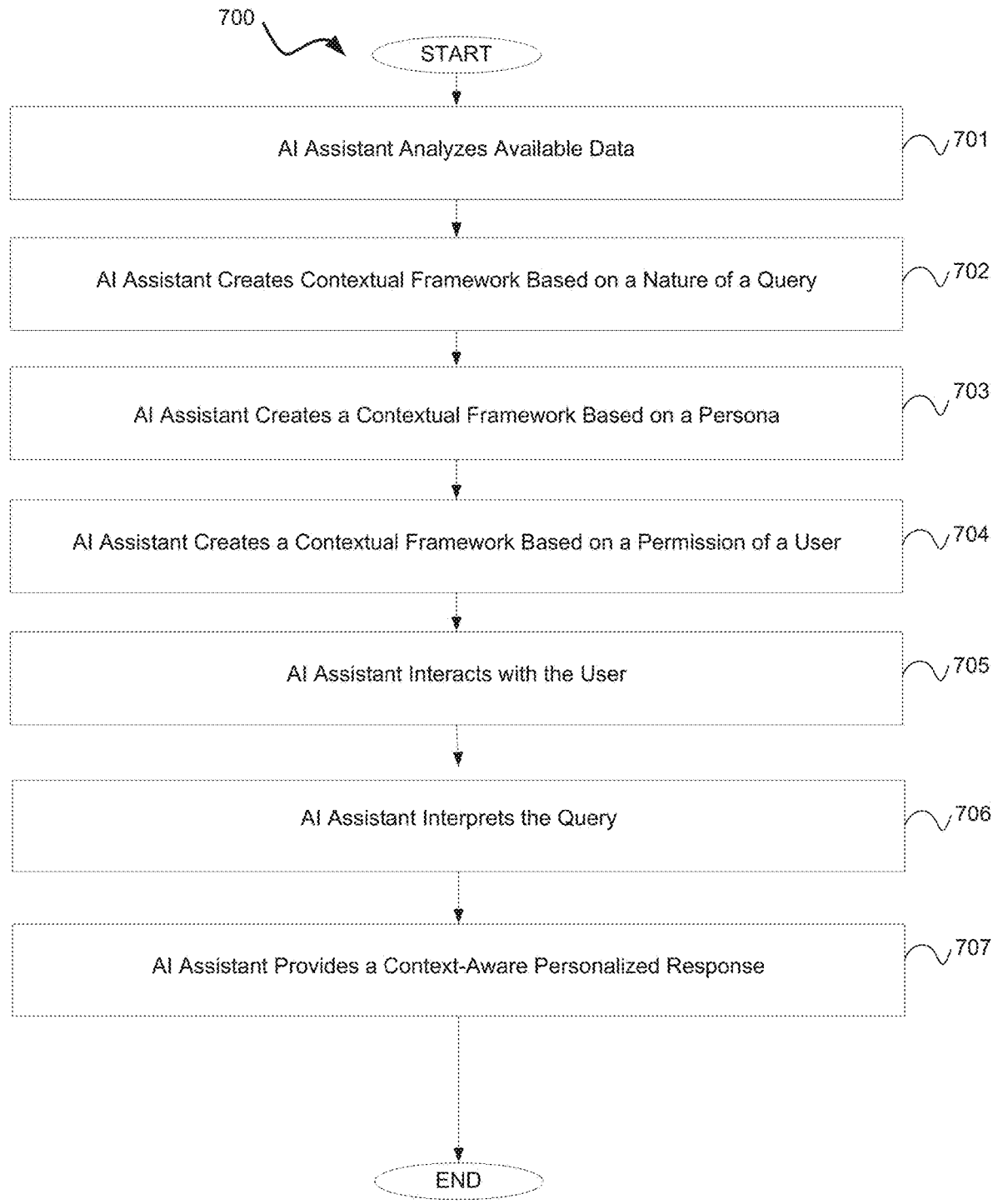
FIG. 7 illustrates an exemplary system configured for AI assistant integration.

FIG. 7 illustrates an exemplary system 700 configured for AI assistant integration.

At step 701, the AI assistant analyzes available data.

At step 702, the AI assistant creates a contextual framework based on a nature of a query. According to various exemplary embodiments, the concept of "context" is vital when working with modern LLMs. Context allows queries to be augmented with vast amounts of relevant information, such as regulatory requirements, internal documents, business-sensitive data, customer information (including PII), and more. Additionally, the LLM model itself can be fine-tuned for specific business needs or may involve AI agents trained for particular tasks. Additionally, in some exemplary embodiments, context may be created by retrieval augmented generation (RAG). A key security consideration remains the need to ensure that sensitive information is not leaked during the context generation process. On contextual data analysis, technologies like RAG allow the system to query data sources dynamically, retrieving relevant documents and adding them to the static context. From a security perspective, its strong emphasis on policy-defined resource access rules and the explicit obfuscation or transformation of both query and context data before they are sent to the LLM engine (109). This is advantageous when dealing with public LLM services (e.g., ChatGPT), though even in enterprise-wide instances, obfuscation remains critical to prevent sensitive data from leaking to unauthorized users.

At step 703, the AI assistant creates a contextual framework based on a persona.

In some exemplary embodiments, the system can also generate a contextual persona based on a job description within an organization, as depicted in the early stages of context creation. This defines the static component of the context, outlining resources available to the user based on their identity and group membership. These resources may include regulatory requirements, internal documents, best practices, and financial data, some of which can be pre-extracted and cached in session variables. These cached data will be transformed or obfuscated to ensure sensitive information does not leak during future requests.

Additionally, in various exemplary embodiments, the system can handle task-specific interactions for different personas. These interactions may take place over a natural language interface ("NLI"). First, the system ensures that the requested task is authorized for the user. Following that, the interaction with data sources and enforcement of policies will proceed similarly to the persona-related workflow. There may be additional elements in the configuration, such as selecting specialized fine-tuned LLM engines or AI agents for specific tasks, which may access data sources not directly available to the user. Again, the transformation or obfuscation of sensitive data will play a key role here.

At step 704, the AI assistant creates a contextual framework based on a permission of a user.

At step 705, the AI assistant interacts with a user.

At step 706, the AI assistant interprets the query.

At step 707, the AI assistant provides a context-aware, personalized response.

Exemplary AI-Powered Contextual Analysis:

The system, according to various exemplary embodiments, includes an artificially intelligent ("AI") AI-powered assistant that automatically analyzes available data to create a contextual framework based on the nature of the query, the persona, and the permissions of the user. This context allows the AI assistant to provide relevant, accurate, and personalized responses to user queries, enhancing user interaction and overall system efficiency. Adding an AI-powered contextual analysis enhances the system's ability to understand and respond to user needs effectively, tailored to each user's specific context and permissions.

Figure 8:
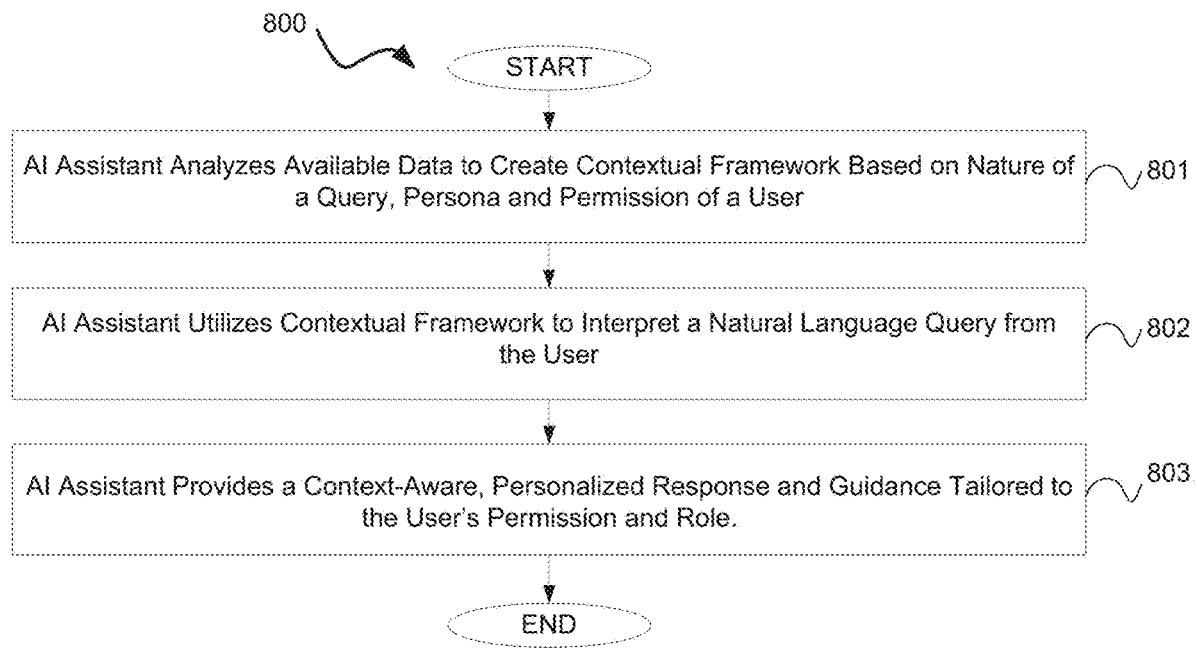
FIG. 8 illustrates an exemplary system configured for the AI assistant performing contextual data analysis.

FIG. 8 illustrates an exemplary system 800 configured for the AI assistant performing contextual data analysis.

At step 801, the AI assistant analyzes the available data to create the contextual framework based on the nature of the query, the persona and the permissions of the user.

At step 802, the AI assistant utilizes the contextual framework to interpret a natural language query from the user.

At step 803, the AI assistant provides a context-aware, personalized response and guidance tailored to the user's permission and role.

Contextual Personas and Job Descriptions:

In certain exemplary embodiments, the system can generate contextual personas based on job descriptions within an organization. By analyzing an employee's job description, the AI assistant builds a profile that includes permissions, responsibilities, and typical queries related to the role. This enables the AI assistant to provide more precise and relevant assistance based on the specific job function. Creating personas based on job descriptions allows the AI assistant to tailor its responses and functionalities to the specific needs of different roles within an organization, improving overall efficiency and user satisfaction.

Figure 9:
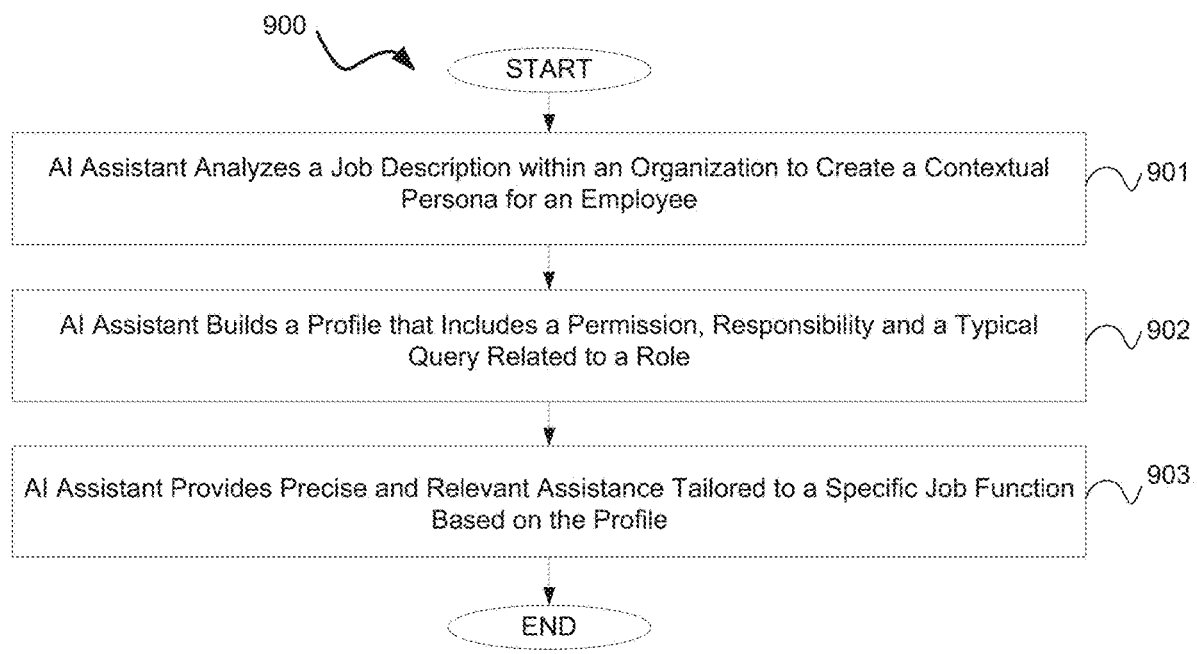
FIG. 9 illustrates an exemplary system configured for the AI assistant performing job description-based personas.

FIG. 9 illustrates an exemplary system 900 configured for the AI assistant performing job description-based personas.

At step 901, the AI assistant analyzes a job description within an organization to create a contextual persona for an employee.

At step 902, the AI assistant builds a profile that includes a permission, responsibility, and a typical query related to a role.

At step 903, the AI assistant provides precise and relevant assistance tailored to a specific job function based on the profile.

Task-Based Contextual Analysis:

In addition to personas, the system, according to many exemplary embodiments, can analyze and respond to specific tasks associated with roles. By defining tasks within the system, the AI assistant can provide task-specific responses and actions. For example, a compliance specialist might define tasks to ensure no traffic from restricted countries is allowed on the WAN interface or to prevent downloads of schematic designs. Including task-based contextual analysis enhances the system's capability to manage and respond to specific operational requirements and security protocols, providing more granular and relevant assistance.

Figure 10:
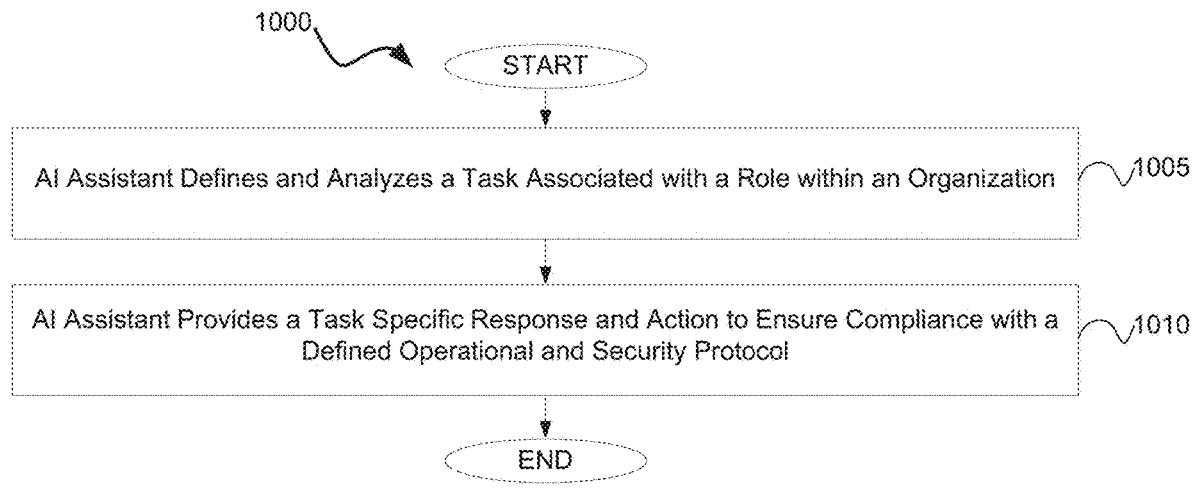
FIG. 10 illustrates an exemplary system configured for the AI assistant performing task-based contextual analysis.

FIG. 10 illustrates an exemplary system 1000 configured for the AI assistant performing tasked-based contextual analysis.

At step 1005, the AI assistant defines and analyzes a task associated with a role within an organization.

At step 1010, the AI assistant provides a task specific response and action to ensure compliance with a defined operational and security protocol, including ensuring no traffic from a restricted country is allowed on a wide area network ("WAN") interface, preventing a download of a schematic design, and blocking traffic to certain addresses.

Integration with Network Appliances and Flow Data:

In various exemplary embodiments, the system integrates with network appliances and flow data, adding contextual personas and tasks to the inputs and outputs of these systems. This includes embedding AI-generated insights into logging streams and ensuring compliance with defined policies. Integrating with network appliances and flow data allows the system to actively manage and monitor network traffic and compliance, enhancing security and operational efficiency. Integration with network appliances and flow data may operate as a separate service. This service will interact with network devices and logs and dynamically reconfigure the policy and context creation engine (303), adjusting policies and context creation rules based on network traffic analysis. This service will include security analyzers and transformers/obfuscators (304) as separate steps in the flow.

Figure 11:
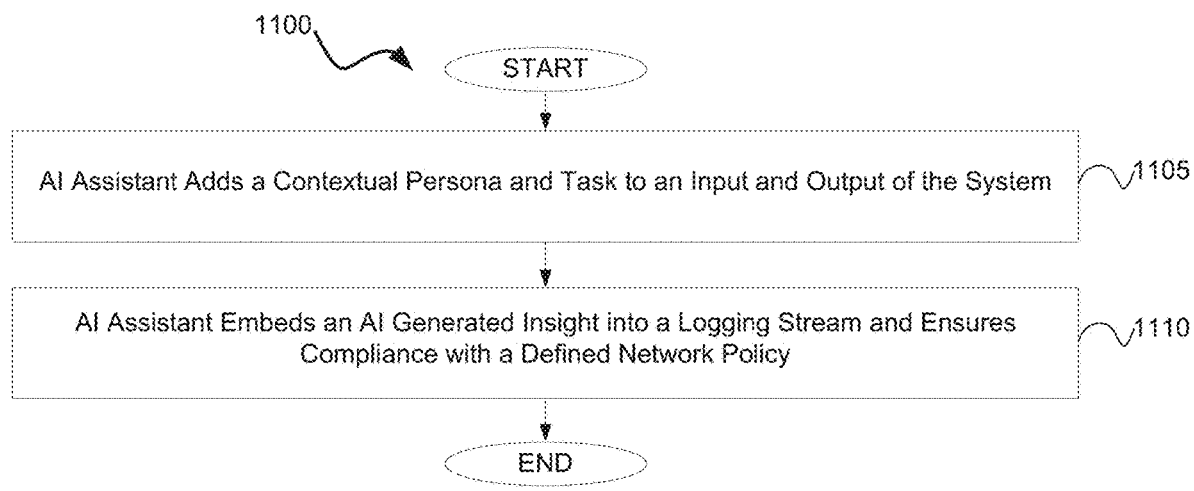
FIG. 11 illustrates an exemplary system configured for the AI assistant performing integration with network appliances and flow data.

FIG. 11 illustrates an exemplary system configured for the AI assistant performing integration with network appliances and flow data.

At step 1105, the AI assistant adds a contextual persona and task to an input and output of the system.

At step 1110, the AI assistant embeds an AI generated insight into a logging stream and ensures compliance with a defined network policy.

In certain exemplary embodiments, at least one AI-powered assistant is configured to define and analyze a task associated with a role within an organization, and the at least one AI-powered assistant is configured to provide a task-specific response and action to ensure compliance with a defined operational and security protocol, including ensuring no traffic from a restricted country is allowed on a WAN interface, preventing a download of a schematic design, and blocking traffic to RFC 1918 IP addresses.

In some exemplary embodiments, RFC 1918 IP addresses are a range of IP addresses designated for private use within internal networks. These addresses are not routable on the public Internet, meaning they are used exclusively within private networks such as homes, offices, or enterprise LANs. They allow devices within a private network to communicate with each other without using globally unique IP addresses. RFC 1918 defines three blocks of IP addresses reserved for private networks:

- 10.0.0.0 to 10.255.255.255 (10.0.0.0/8)—Provides about 16.8 million addresses.
- 172.16.0.0 to 172.31.255.255 (172.16.0.0/12)—Provides about 1 million addresses.
- 192.168.0.0 to 192.168.255.255 (192.168.0.0/16)—Provides about 65,536 addresses.

These addresses are commonly used for internal devices like routers, computers, and other networked devices. To access the public Internet, devices with private IP addresses need to use Network Address Translation (NAT), which maps private IPs to a public IP address assigned to the network.

In the description, for purposes of explanation and not limitation, specific details are set forth, such as particular embodiments, procedures, techniques, etc., to provide a thorough understanding of the present technology. However, it will be apparent to one skilled in the art that the present technology may be practiced in other embodiments that depart from these specific details.

While specific embodiments of, and examples for, the process and compositions are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

While various embodiments have been described above, it should be understood that they have been presented by way of example only and not in limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A data security system for protecting private data within a database, the data security system comprising:

at least one AI-powered assistant configured to analyze available data, create a contextual framework based on a nature of a query, a persona, and a permission of a user and the at least one AI-powered assistant configured to define and analyze a task associated with a role within an organization;

the at least one AI-powered assistant configured to provide a task-specific response and action to ensure compliance with a defined operational and security protocol, including ensuring no traffic from a restricted country is allowed on a WAN interface, preventing a download of a schematic design, and blocking traffic to RFC 1918 IP addresses;

the at least one AI-powered assistant configured to interact with the user, interpret the query and provide a context-aware, personalized response;

the at least one AI-powered assistant configured to perform behavioral analysis based on a history of the user and user's associated benign or malicious behavior, determine suspicious behavior from outliers in user activity by monitoring sudden changes in an amount and type of data sought by the user, apply probabilistic reasoning to classify suspicious behavior when query patterns change in scope or frequency, maintain a complete audit trail of all data access events, and enable zero trust for data use; and at least one data access proxy communicatively coupled with at least one private database, the at least one data access proxy further communicatively coupled with at least one server, the at least one server configured to operate the at least one data access proxy to:

a) identify the user and a request from the user to access at least one data item stored in the at least one private database;

b) validate the user and the request using the behavioral analysis and outlier detection, the validation including inspecting the user's identity, evaluating the user's activity history, evaluating permissions and restrictions associated with the user and the at least one data item, and analyzing patterns in user activity for suspicious behavior including sudden changes in the scope or the frequency of queries;

c) access the at least one private database to retrieve the at least one data item;

d) inspect one or more security attributes related to the at least one data item; and
e) transform the at least one data item based on one or more privacy rules, the transformation including: redacting information from the at least one data item, deleting information from the at least one data item, substituting information from the at least one data item with other information, adding information to the at least one data item, providing synthetic data as a private data item, and providing proxy data for the at least one data item.

2. The data security system of claim 1, wherein the at least one server is further configured to provide a response to the user, the response comprising a transformed version of the requested at least one data item, the transformed version being accessible to the user by way of the at least one data access proxy.

3. The data security system of claim 1, wherein the at least one server is further configured to operate the at least one data access proxy to provide schemas of introducing misinformation as part of the task-specific response, the misinformation functioning as a tracker for tracing a flow of information and identifying a malicious user.

4. The data security system of claim 1, wherein the user is identified by comparing the user's identity with information from a user database.

5. The data security system of claim 4, wherein the user database stores one or more of: the identity of the user, a query history of the user, the activity history of the user, and other information regarding the user.

6. The data security system of claim 1, the at least one data access proxy further functioning as a single front end between and communicatively coupled with one or more data consumers and one or more data side silos in an organization.

7. The data security system of claim 6, the at least one server further configured to operate the at least one data access proxy to integrate a plurality of new data consumers and new data silos.

8. The data security system of claim 6, the at least one server further configured to operate the at least one data access proxy to query the data security system with a common query language or a native protocol of the user.

9. The data security system of claim 1, further comprising the AI-powered assistant configured to:
utilize the contextual framework to interpret a natural language query from the user; and
provide a context-aware, personalized response and guidance tailored to the user's permission and role.

10. The data security system of claim 1, further comprising the AI-powered assistant configured to:
analyze a job description within an organization to create a contextual persona for an employee;
build a profile that includes a permission, responsibility, and a typical query related to a role; and
provide precise and relevant assistance tailored to a specific job function based on the profile.

11. The system of claim 1, further comprising the AI assistant configured to:
integrate with a network appliance and a flow data system;
add a contextual persona and task to an input and output of the system; and
embed an AI-generated insight into a logging stream and ensure compliance with a defined network policy.

12. A method for data security, implemented with at least one server communicatively coupled to at least one data access proxy, the at least one data access proxy communicatively coupled to at least one network architecture for one or more organizations, the method comprising:
configuring at least one AI-powered assistant to analyze available data, create a contextual framework based on a nature of a query, a persona, and a permission of a user and the at least one AI-powered assistant configured to define and analyze a task associated with a role within an organization, provide a task-specific response and action to ensure compliance with a defined operational and security protocol, including ensuring no traffic from a restricted country is allowed on a WAN interface, preventing a download of a schematic design, and blocking traffic to RFC 1918 IP addresses, interact with the user, interpret the query and provide a context-aware, personalized response, perform behavioral analysis based on a history of the user and user's associated benign or malicious behavior, determine suspicious behavior from outliers in user activity by monitoring sudden changes in an amount and type of data sought by the user, apply probabilistic reasoning to classify suspicious behavior when query patterns change in scope or frequency, maintain a complete audit trail of all data access events, and enable zero trust for data use;
identifying the user and a request from the user to access at least one data item stored in at least one private database;
validating the user and the request by the at least one server, the validation including inspecting the user's identity, evaluating the user's activity history, and evaluating permissions and restrictions associated with the user and the at least one data item;
accessing the at least one private database by the at least one server to retrieve the at least one data item;
inspecting one or more security attributes related to the at least one accessed data item; and
transforming the at least one data item based on one or more privacy rules, the transformation including: redacting information from the at least one data item, deleting information from the at least one data item, substituting information from the at least one private data item with other information, adding information to the at least one data item, providing synthetic data as a private data item, and providing proxy data for the at least one data item.

13. The method of claim 12, further comprising providing a response to the user, the response comprising a transformed version of the requested at least one data item, the transformed version being accessible to the user by way of the at least one data access proxy.

14. The method of claim 12, further comprising providing schemas of introducing misinformation as part of the task-specific response, the misinformation functioning as a tracker for tracing a flow of information and identifying a malicious user.

15. The method of claim 12, further comprising recognizing anomalous behavior, tokenizing the anomalous behavior or user associated with the anomalous behavior, and tracking the anomalous behavior or the user associated with the anomalous behavior.

16. The method of claim 12, further comprising comparing the user's identity with information from a user database to identify the user.

17. The method of claim 16, further comprising storing the user's information in a user database.

18. The method of claim 12, wherein the at least one data access proxy further functions as a single front end between and communicatively coupled with one or more data consumers and one or more data side silos in an organization.

19. The method of claim 18, further comprising normalizing a data format for the data across the one or more data consumers and the one or more data silos within the at least one network architecture.

20. The method of claim 18, wherein the at least one server is further configured to operate the at least one data access proxy to integrate a plurality of new data consumers and new data silos.

21. The method of claim 19, the at least one server further configured to operate the at least one data access proxy to query the data security with a common query language or a native protocol of the user.

22. A non-transitory computer-readable storage medium having embodied thereon a program, the program being executable by a processor to perform a method for data security, implemented with at least one server communicatively coupled to at least one data access proxy, the at least one data access proxy communicatively coupled to at least one network architecture for one or more organizations, the method comprising:

configuring at least one AI-powered assistant to analyze available data, create a contextual framework based on a nature of a query, a persona, and a permission of a user, and the at least one AI-powered assistant configured to define and analyze a task associated with a role within an organization, provide a task-specific response and action to ensure compliance with a defined operational and security protocol, including ensuring no traffic from a restricted country is allowed on a WAN interface, preventing a download of a schematic design, and blocking traffic to RFC 1918 IP addresses, interact with the user, interpret the query and provide a context-aware, personalized response, perform behavioral analysis based on a history of the user and user's associated benign or malicious behavior, determine suspicious behavior from outliers in user activity by monitoring sudden changes in an amount and type of data sought by the user, apply probabilistic reasoning to classify suspicious behavior when query patterns change in scope or frequency, maintain a complete audit trail of all data access events, and enable zero trust for data use;

identifying the user and a request from the user to access at least one data item stored in at least one private database;

validating the user and the request by the at least one server, the validation including inspecting the user's identity, evaluating the user's activity history, and evaluating permissions and restrictions associated with the user and the at least one data item;

accessing the private database by the at least one server to retrieve the at least one data item;

inspecting one or more security attributes related to the at least one accessed data item; and transforming the at least one data item based on one or more privacy rules, the transformation including: redacting information from the at least one data item, deleting information from the at least one data item, substituting information from the at least one data item with other information, adding information to the at least one data item, providing synthetic data as a private data item, and providing proxy data for the at least one data item.

* * * * *